United States Patent
Xu et al.

(10) Patent No.: US 8,447,897 B2
(45) Date of Patent: May 21, 2013

(54) BANDWIDTH CONTROL FOR A DIRECT MEMORY ACCESS UNIT WITHIN A DATA PROCESSING SYSTEM

(75) Inventors: Kun Xu, Austin, TX (US); Tommi M. Jokinen, Austin, TX (US); David B. Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 147 days.

(21) Appl. No.: 13/168,331

(22) Filed: Jun. 24, 2011

(65) Prior Publication Data

US 2012/0331187 A1 Dec. 27, 2012

(51) Int. Cl.
*G06F 3/00* (2006.01)
*G06F 5/00* (2006.01)

(52) U.S. Cl.
USPC .............................. 710/24; 710/308

(58) Field of Classification Search
USPC .................. 710/22–28, 308, 58–60
See application file for complete search history.

(56) References Cited

U.S. PATENT DOCUMENTS

| | | | |
|---|---|---|---|
| 5,109,501 A * | 4/1992 | Kaneko et al. ................. | 710/26 |
| 5,386,532 A * | 1/1995 | Sodos ............................ | 710/22 |
| 5,644,787 A * | 7/1997 | Nakamura et al. ............. | 710/33 |
| 5,761,537 A | 6/1998 | Sturges et al. | |
| 5,832,308 A * | 11/1998 | Nakamura et al. ............. | 710/53 |
| 5,948,080 A * | 9/1999 | Baker ............................ | 710/37 |
| 5,958,025 A * | 9/1999 | Sonobe ......................... | 710/27 |
| 6,026,443 A | 2/2000 | Oskouy et al. | |
| 6,199,121 B1 * | 3/2001 | Olson et al. ................... | 710/24 |
| 6,449,666 B2 * | 9/2002 | Noeldner et al. .............. | 710/23 |
| 6,557,052 B1 * | 4/2003 | Kubo ............................. | 710/23 |
| 6,731,644 B1 | 5/2004 | Epps et al. | |
| 6,857,031 B2 * | 2/2005 | Kubo ............................. | 710/53 |
| 6,915,357 B2 * | 7/2005 | Kawase ......................... | 710/25 |
| 7,007,111 B2 | 2/2006 | Sihlbom et al. | |
| 7,035,956 B2 * | 4/2006 | Tanaka .......................... | 710/306 |
| 7,305,499 B2 * | 12/2007 | Furuta et al. .................. | 710/22 |
| 7,522,522 B2 | 4/2009 | Dropps et al. | |
| 8,176,221 B2 * | 5/2012 | Nagai et al. ................... | 710/22 |
| 2002/0026544 A1 * | 2/2002 | Miura ............................ | 710/25 |
| 2003/0088718 A1 * | 5/2003 | Higuchi ........................ | 710/6 |
| 2003/0167368 A1 * | 9/2003 | Tanaka .......................... | 710/305 |
| 2005/0223136 A1 * | 10/2005 | Tanaka et al. ................. | 710/22 |
| 2009/0037615 A1 * | 2/2009 | Kodaira ......................... | 710/25 |
| 2010/0293304 A1 | 11/2010 | Alexandron et al. | |

OTHER PUBLICATIONS

U.S. Appl. No. 13/106,703, filed May 12, 2011.
Abts, D. et al., "Age-Based Packet Arbitration in Large-Radix k-ary n-cubes", SC '07 Proceedings of the 2007 ACM/IEEE conference on Supercomputing, 2007, 11 pages.
Guderian, F. et al., "Fair Rate Packet Arbitration in Network-on-Chip", SOC Conference (SOCC), 2011 IEEE International, Sep. 2011, pp. 278-283.

(Continued)

*Primary Examiner* — Christopher B Shin

(57) ABSTRACT

A method for controlling bandwidth in a direct memory access (DMA) unit of a computer processing system, the method comprising: assigning a DMA job to a selected DMA engine; starting a source timer; and issuing a request to read a next section of data for the DMA job. If a sufficient amount of the data was not obtained, allowing the DMA engine to wait until the source timer reaches a specified value before continuing to read additional data for the DMA job.

20 Claims, 7 Drawing Sheets

OTHER PUBLICATIONS

Guo, Z. et al., "Analysis of a Flow Control System for a Combined Input-Crosspoint Buffered Packet Switch", IEEE High Performance Switching and Routing, 2005, pp. 336-340.

Guo, Z. et al., "Framed Round-Robin Arbitration with Explicit Feedback Control for Combined Input-Crosspoint Buffered Packet Switches", Workshop on High Performance Switching and Routing, 2007, pp. 1-5.

Jiang, N. et al., "Performance Implications of Age-Based Allocation in On-Chip-Networks", Technical Report 129, Concurrent VLSI Architectures Group, Stanford University, May 2011, 21 pages.

Kornaros, G., "BCB: A Buffered CrossBar Switch Fabric Utilizing Shared Memory", Proceedings of the 9th Euromicro Conference on Digital System Design: Architectures, Methods and Tools, 2006, 6 pages.

Lee, M. et al., "Approximating Age-Based Arbitration in On-Chip Networks", Proceedings of the 19th international conference on Parallel architectures and compilation techniques, Jul. 10, 2009, 2 pages.

Lee, M. et al., "Probabilistic Distance-based Arbitration: Providing Equality of Service for Many-core CMPs", Proceedings of the 2010 43rd Annual IEEE/ACM International Symposium on Microarchitecture, 2010, 11 pages.

Lin, Y. et al., "VLSI Design of a Priority Arbitrator for Shared Buffer ATM Switches", 1997 IEEE International Symposium on Circuits and Systems, Hong Kong, 4 pages.

Rojas-Cessa, R., "High Performance Round-Robin Arbitration Schemes for Input-Crosspoint Buffered Switches", Workshop on High Performance Switching and Routing, 2004, 5 pages.

Song, Y. et al., "Distributed Resolution of Network Congestion and Potential Deadlock using Reservation-based Scheduling", IEEE Transactions on Parallel and Distributed Systems, 2005, 30 pages.

U.S. Appl. No 13/454,505, filed Apr. 24, 2012, entitled "Direct Memory Access Buffer Utilization".

* cited by examiner

BANDWIDTH CONTROL FOR A DIRECT MEMORY ACCESS UNIT WITHIN A DATA PROCESSING SYSTEM

BACKGROUND

1. Field

This disclosure relates generally to data processing systems, and more specifically, to bandwidth control for a direct memory access unit within a data processing system.

2. Related Art

Conventional direct memory access (DMA) operations move information from one location to another, typically independent of a central processor or central processing unit (CPU). However, inefficiencies arise when DMA operations transfer information between a combination of higher speed and lower speed devices, such as input/output (I/O) devices, peripherals, and local memory. For example, a slow device may have bandwidth constraints that are lower than the capability of the DMA unit, causing request queues between the DMA unit and the slow device to fill up. This limits the bandwidth available for higher speed devices. Therefore, a need exists for improved bandwidth control for a DMA unit.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
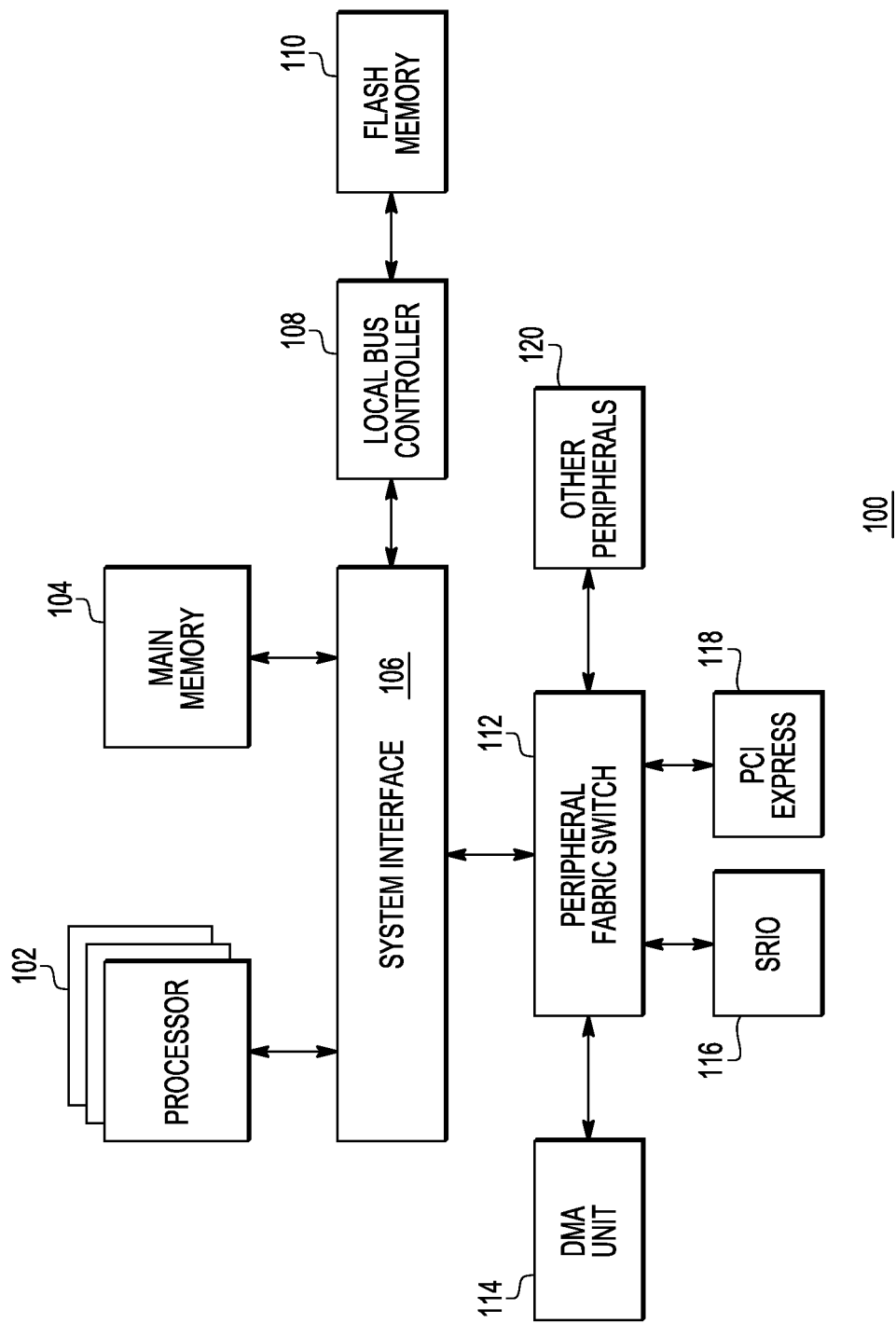
FIG. 1 illustrates, in block diagram form, a data processing system having a direct memory access (DMA) unit and a peripheral fabric switch in accordance with one embodiment of the present invention.

A direct memory access (DMA) unit is capable of performing data transfers between a variety of devices which may have different operating speeds. In one embodiment, transfers between devices are performed through the use of shared request queues in which one device may receive requests from various different devices. Therefore, a slow device which has bandwidth constraints that are lower than the capability of the DMA unit may cause the filling of a request queue. This may therefore limit the available bandwidth for higher speed devices. In one embodiment, a DMA unit has a number of internal DMA engines each capable of handling a DMA job or transaction. In order to complete a DMA job or transaction, the corresponding DMA engine is capable of providing read and write requests to the shared request queues. In order to prevent DMA jobs to/from other high speed device from getting blocked by DMA jobs to/from lower speed devices, DMA jobs may be independently throttled. In one embodiment, separate source and destination throttle controls (i.e. read and write throttle controls) may be used for each DMA job performed by a corresponding DMA engine in the DMA unit. The source throttle control may be provided in a frame descriptor or source descriptor of a DMA job while the destination throttle control may be provided in a destination descriptor of the DMA job. The throttle controls may be used to ensure that only a limited number of read requests or write requests of a DMA job occur within a particular window of time such that the read requests or write requests of the DMA job can be throttled accordingly.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a data processing system 100 in accordance with one embodiment. System 100 includes one or more processors 102 coupled to a system interface 106, a main memory 104 coupled to system interface 106, and a local bus controller 108 coupled to system interface 106, and a FLASH memory 110 coupled to local bus controller 108. System 100 also includes a peripheral fabric switch 112 coupled to system interface 106 and which may be coupled to any number of peripheral devices. System 100 includes a DMA unit 114, a serial rapid input/output (SRIO) system 116, a peripheral component interface (PCI) express system 118, and any other peripherals 120, each of which is coupled to peripheral fabric switch 112. Although multiple processors 102 may be included, any number of processors may be present within system 100. System 100 may be implemented as a system-on-chip (SOC) or as an embedded processing system or the like. System 100 may be configured according to many different types of processing applications. Main memory 104 is configured in any suitable manner. Main memory 104 may be implemented using any type of memory devices, such as random access memory (RAM) devices or the like. In one embodiment, main memory 104 includes double data rate synchronous dynamic RAM (DDR SDRAM or DDR1, SDRAM, DDR2 SDRAM, DDR3, DDR4 etc.) devices and the like, although alternative types of memory devices may be used, such as single data rate (SDR) SDRAM devices. Any type of device may be coupled to local bus controller 108, such as FLASH memory 110. System interface 106 may be configured according to any type of bus structure, switch structure, switch fabric, network structure, etc., for enabling communication between processors 102, main memory 104, local bus controller 108 and various devices coupled to peripheral fabric switch 112.

Peripheral fabric switch 112 enables communication between peripheral devices, such as SRIO 116, PCI express 118, and other peripherals 120 and also enables communication between the peripheral devices and to other portions of system 100 by way of system interface 106. Also, DMA unit 114 may direct data transfers between peripherals by way of peripheral fabric switch 112 and between peripherals and devices coupled to system interface 106 by way of peripheral fabric switch 112 and system interface 106. The illustrated peripheral devices are exemplary only and it is understood that other types of peripherals and I/O devices may be present within system 100.

In operation, main memory 104 and other devices of system 100 (such as local bus controller 108, SRIO 116, PCI Express 118, and other peripherals 120) are memory mapped devices which are accessed or addressed according to a memory map. Each memory map is an area of one or more addressable memory locations for reading from or writing to the memory mapped devices as understood by those skilled in the art. DMA unit 114 may be used to transfer data between devices of system 100. For example, DMA unit 114 may direct the transfer of data between two or more devices coupled to peripheral fabric switch 112. In this example, data is transferred by way of peripheral fabric switch 112 between peripheral devices. DMA unit 114 may also direct the transfer of data between one or more devices coupled to peripheral fabric switch 112 and one or more devices coupled to system interface 106. In this example, data is transferred by way of peripheral fabric switch 112 and system interface 106. In one embodiment, any read or write requests which are made to devices coupled to system interface 106 are all provided by way of a same request queue which stores requests to system interface 106 and is managed by peripheral fabric switch 112. Therefore, read and write requests to slower devices present within that same queue may inhibit read and write requests to faster devices of system 100. For example, in one embodiment, main memory 104 is a fast devices allowing for fast access as compared to, for example, local bus controller 108 or some of the peripherals coupled to peripheral fabric switch 112. Operation of DMA unit 114 and peripheral fabric switch 112 will be described in more detail with respect to FIG. 2 below.

Figure 2:
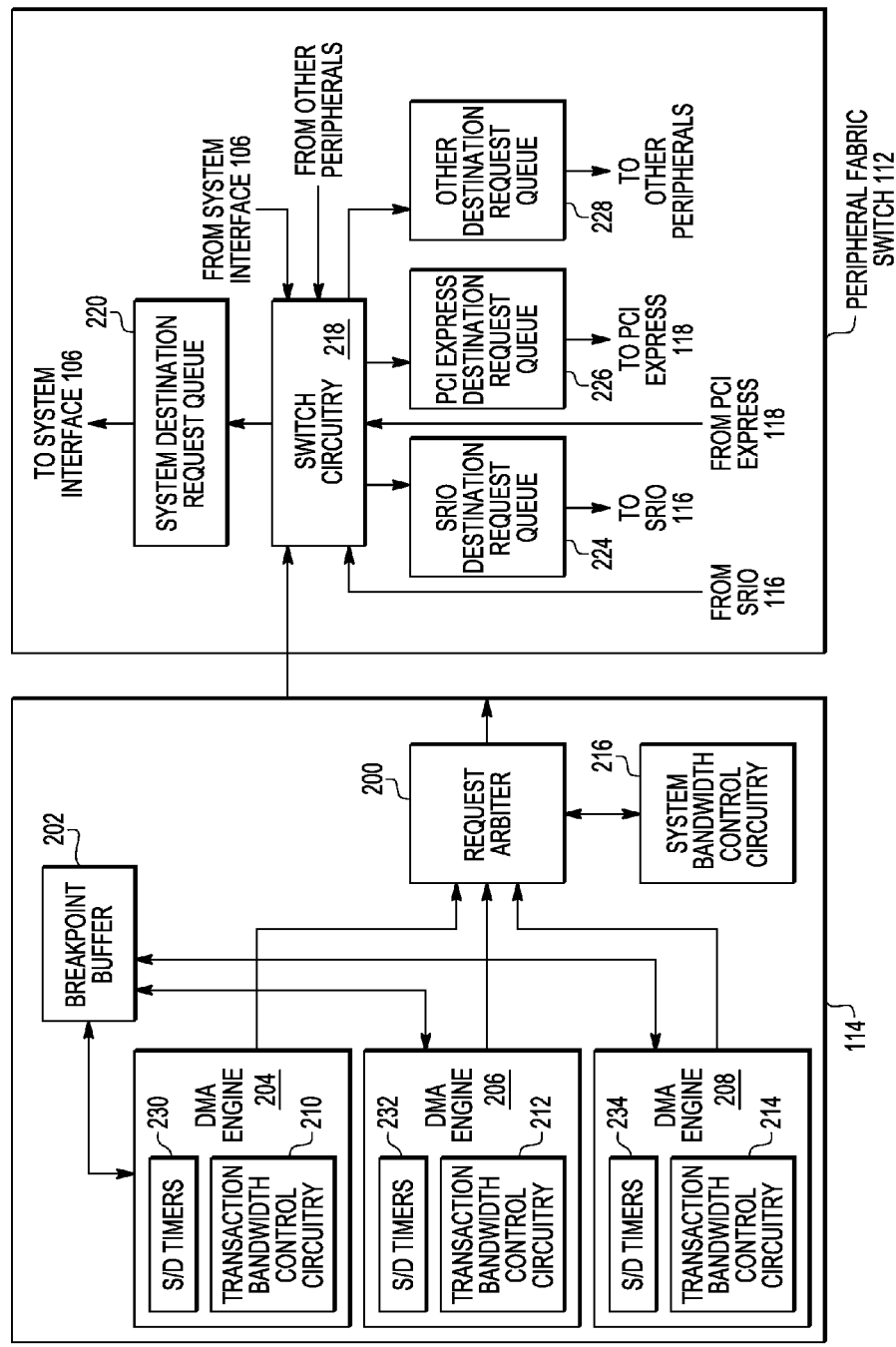
FIG. 2 illustrates, in block diagram form, the DMA unit of FIG. 1 and the peripheral fabric switch of FIG. 1, in accordance with one embodiment of the present invention.

FIG. 2 illustrates, in block diagram form, DMA unit 114 and peripheral fabric switch 112 of FIG. 1. DMA unit 114 includes DMA engines 204, 206, and 208, breakpoint buffer 202, request arbiter 200, and system bandwidth control circuitry 216. In the illustrated embodiment, DMA unit 114 includes 3 DMA engines, however, DMA unit 114 may include any number of DMA engines. In one embodiment, each DMA engine is capable of handling one DMA job or transaction at a time. Therefore, DMA unit 114, with 3 DMA engines, is capable of simultaneously handling 3 DMA jobs. Furthermore, each DMA job performs a data transfer from one source (i.e. source device) to one or more destinations (i.e. target devices). Each DMA engine includes source and destination timers (S/D timers) and transaction bandwidth control circuitry: DMA engine 204 includes S/D timers 230 and transaction bandwidth control circuitry 210, DMA engine 206 includes S/D timers 232 and transaction bandwidth control circuitry 212; and DMA engine 208 includes S/D timers 234 and transaction bandwidth control circuitry 214. S/D timers includes one source timer and one or more destination timers. In the case where a DMA engine only performs transfers between one source and one destination, only one destination timer may be used. However, if a DMA engine is capable of performing transfers between one source and multiple destinations, then the DMA engine may include a number of destination timers corresponding to the maximum number of destinations supported for a DMA job. Breakpoint buffer 202 is coupled to each of the DMA engines and is used to store information from a DMA engine when a DMA job of the DMA engine is throttled or otherwise interrupted. Request arbiter 200 is coupled to each of the DMA engines and system bandwidth control circuitry 216, and appropriately routes read and write requests from the DMA engines to peripheral fabric switch 112.

Peripheral fabric switch 112 includes switch circuitry 218 and a plurality of request queues. In the illustrated embodiment, each device coupled to peripheral fabric switch 112 within system 100 has a corresponding request queue, such as, for example, system destination request queue 220, SRIO destination request queue 224, PCI express destination queue 226, and other destination request queues 228. System destination request queue 220 is coupled to switch circuitry 218 and provides read and write requests directed to a device coupled to system interface 106 to system interface 106. That is, system destination request queue 220 stores the read and write requests which may be received from any of the devices coupled to peripheral fabric switch 112 and are waiting to be processed by one of the devices coupled to system interface 106 (such as, for example, processors 102, main memory 104, local bus controller 108). Similarly, SRIO destination queue 224 is coupled to switch circuitry 218 and provides read and write requests directed to SRIO 116 to SRIO 116, and PCI Express destination queue 226 is coupled to switch circuitry 218 and provides read and write requests directed to PCI Express 118 to PCI Express 118. Similarly, other destination requests queues 228 would be present for any other peripherals 120 coupled to peripheral fabric switch 112, each queue storing read and write requests directed to the corresponding peripheral. Switch circuitry 218 routes the read and write requests from the originating device to the appropriate destination queue based on the target of the read or write request. In the illustrated embodiment, the destination queues are provided within peripheral fabric switch 112. However, in alternate embodiments, each of the destination queues is located within each corresponding peripheral or elsewhere within system 100.

In one embodiment, the DMA jobs set up by DMA unit 114 are defined by frame descriptors which provide the necessary control information for each DMA job for use by DMA unit 114 to appropriately set up a DMA job with a selected DMA engine. In one embodiment, each frame descriptor also points to one or more destination descriptors, and will be described in more detail below in reference to FIG. 4. Each DMA job may involve a transfer of data from any source device within system 100 to any one or more destination devices within system 100. Each DMA job, in order to complete the full data transfer, generates a series of read or write requests. Each read or write request may be, for example, for a granularity of data supported by a cache portion of main memory 104. The read or write requests generated by a DMA engine are then arbitrated by request arbiter 200 and provided to the appropriate destination request queue. In the illustrated embodiment, note that any read or write requests directed to devices coupled to system interface 106 (such as processors 102, main memory 104, and local bus controller 108/flash memory 110) are provided to system destination request queue 220. As the requests from this queue are processed (i.e. consumed) by the appropriate target devices coupled to system interface 106, DMA unit 114 is able to provide more requests to system destination requests queue 220. Note that read and write requests made to a fast target, such as main memory 104, are processed more quickly as compared to requests made to a slower target, such as FLASH memory 110 by way of local bus controller 108. Therefore, requests to main memory 104 may be undesirably inhibited by requests to the slower target. Therefore, in one embodiment, a source throttle control (i.e. read throttle control) and destination throttle control (i.e. write throttle control) is provided for each DMA job in order to throttle a DMA job as needed so as to allow other DMA jobs to proceed. In one embodiment, the source throttle controls are provided as part of the frame descriptor itself and the destination throttle controls are provided as part of the destination descriptor accessible by way of the frame descriptor. In one embodiment, if a frame descriptor describes a data transfer having multiple destinations, then multiple destination descriptors are used, each having its own destination throttle control. Therefore, note that DMA unit 114 may be throttled on a DMA job basis or on a destination basis to control bandwidth.

The source and destination throttle controls, as will be described in more details with respect to the flow charts below, are used with the S/D timers to appropriately throttle a DMA job. When a particular DMA job of a DMA engine is throttled, appropriate information may be stored into breakpoint buffer 202 which allows the DMA engine to restart the DMA job when appropriate.

Figure 3:
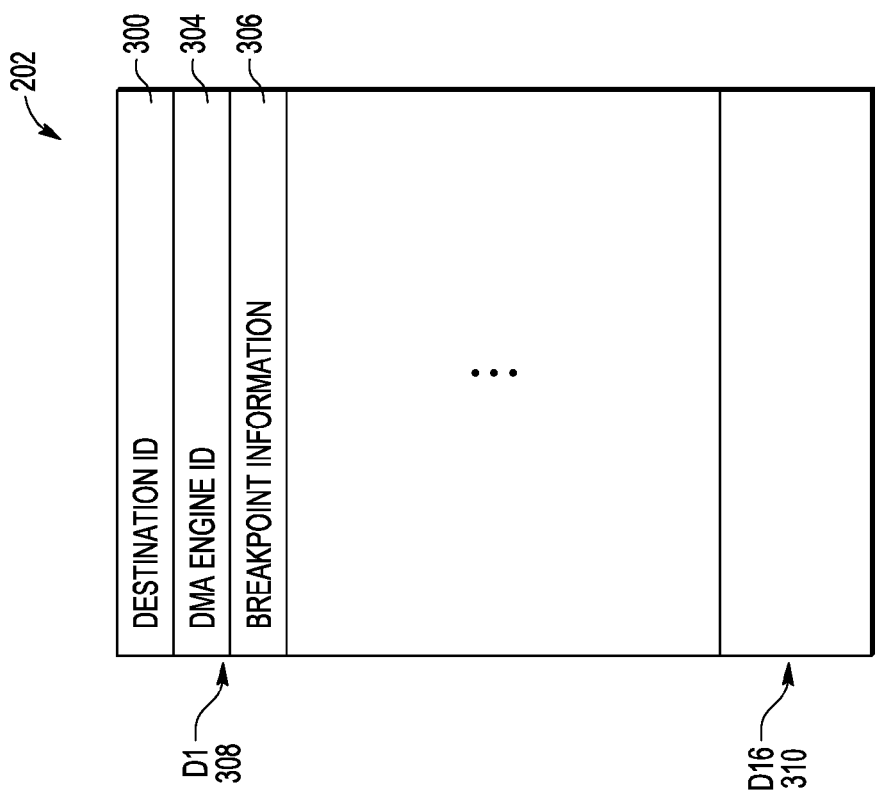
FIG. 3 illustrates, in block diagram form, a breakpoint buffer of the DMA unit of FIG. 2 in accordance with one embodiment of the present invention.

FIG. 3 illustrates, in diagrammatic form, breakpoint buffer 202. In the illustrated embodiment, breakpoint buffer 202 includes 16 entries, entry D1 308 through entry D16 310. Each entry corresponds to a particular destination of a DMA job. Breakpoint buffer 202 may include any number of entries, depending on the number of breakpoints to be supported. Each breakpoint entry in breakpoint buffer 202 allows for a particular DMA job or portion of DMA job to be restored. For example, entry D1 308 stores a destination identifier (ID) 300, a destination throttle control (DTC) 302, a DMA engine ID 304, and other breakpoint information 306 (including, for example, a valid indicator to indicate whether the current entry is valid). Therefore, each entry may also store this information. Usage of breakpoint buffer 202 will be described in further detail below.

Figure 4:
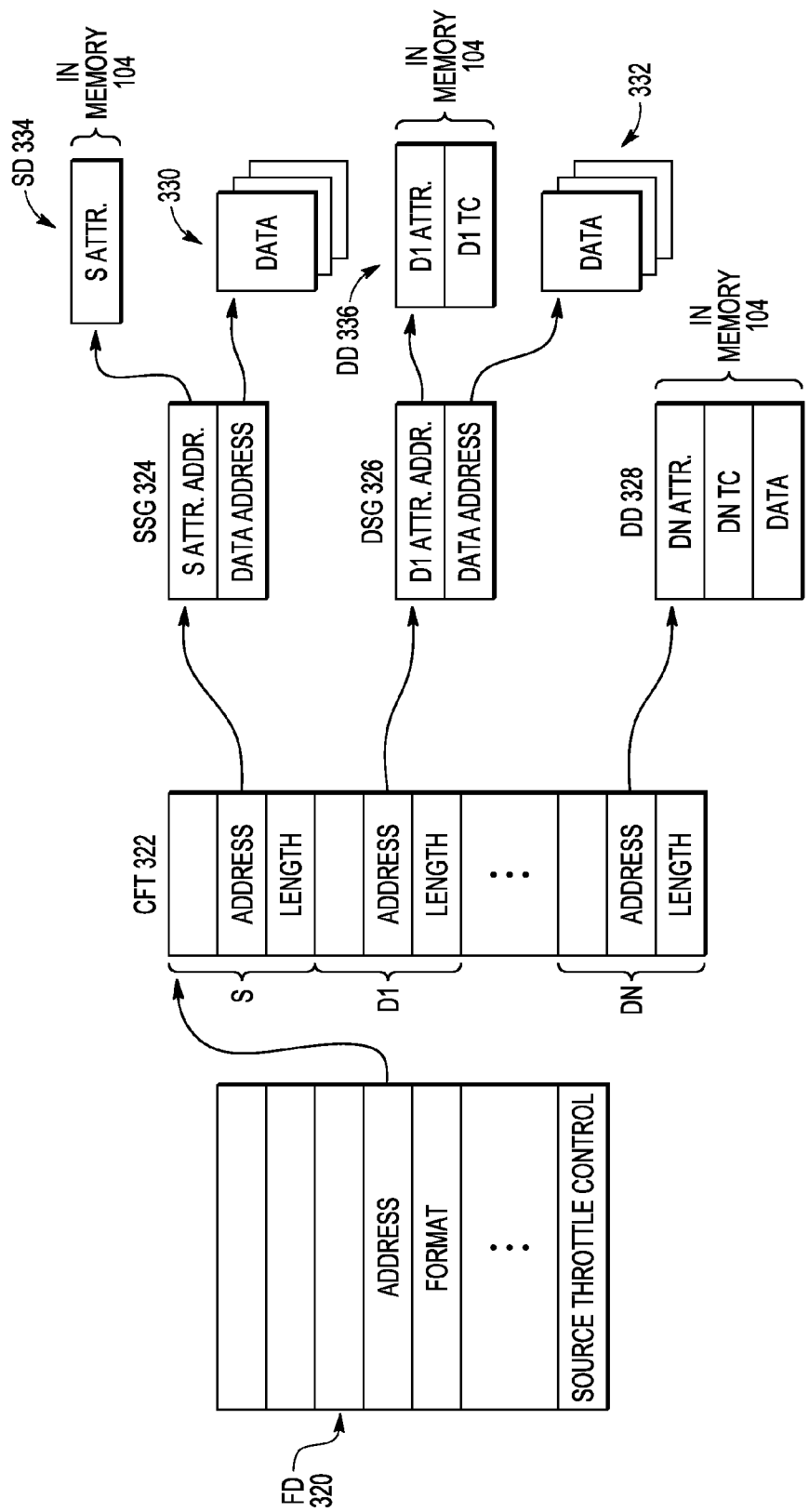
FIG. 4 illustrates, in diagrammatic form, a frame descriptor (FD) format in accordance with one embodiment of the present invention.

FIG. 4 illustrates, in diagrammatic form, a frame descriptor (FD) 320 which may be used by DMA unit 114 to set up a DMA job. FD 232 includes an address field which points to a compound frame table (CFT) 322. FD 320 also includes a format value which provides format information, such as whether the current DMA job has a single destination or is a multicast job with multiple destinations. FD 320 also includes a source throttle control (STC) value which indicates whether source throttling is enabled or not. For example, a value of zero (or another predetermined value) may indicate that source throttling is disabled. If STC is a value greater than zero (or is different than the another predetermined value), then this value is used to perform source throttling, as will be described below. FD 320 may also include other fields of information as needed for defining the DMA job or operation. CFT 322 includes a source record (S) and one or more destination records (D1 . . . DN). CFT 322 can therefore include any integer number N of destination records which may support a multicast DMA job to up to N destinations. The source record includes a source address which points to source scatter/gather (SSG) 324. The source record also includes a length which indicates the total length of the source data to be transferred. The source record may also include other fields of information as needed for defining the source. Each destination record includes a destination address which points to a corresponding destination scatter/gather (DSG 326) or destination descriptor (DD 328) and a destination length which indicates the total length of the corresponding destination location. SSG 324 includes a source attributes address which points to a source descriptor (SD) 334 which stores source attributes. These source attributes provide information about the source, such as the source type. SSG 324 also includes one or more data addresses which point to the source data 330 itself. Note that the source data may or may not be contiguously stored in the source. DSG 326 includes a destination attributes address which points to a destination descriptor (DD) 336 which stores destination attributes for destination D1. These destination attributes includes the attributes (D1 attributes) and the destination throttle control (D1 TC) value. As with the STC, the destination throttle control is used to indicate whether destination throttling is enabled. For example, a value of zero (or another predetermined value) may indicate that destination throttling is disabled, and a value greater than zero (or different than the another predetermined value) is used to perform destination throttling. Note that the destination throttle control value is specific to the particular destination, such as D1 in the current example. The destination attributes (D1 attributes) provide information about the destination, such as the destination type. DSG 326 also includes one or more data addresses which point to the locations for the destination data 332 itself. Note that the destination data locations may or may not be contiguous.

In one embodiment, SSG 324 and DSG 326 are configured in a scatter/gather format in which the data is indicated by addresses within the SSG or the DSG and not provided within the SSG or DSG itself. In this scatter/gather embodiment, the source and destination attributes (e.g. the SD and DD) and the destination throttle control may be stored in main memory 104 while the source data is located within the source device. However, other formats may be used. For example, destination (DN) record points to DD 328 which is not in a scatter/gather format in which the destination attributes (DN attributes), the destination throttle control (DN TC) value, and the location for the destination data are all a part of DD 328. Therefore, DD 328 includes the destination descriptor as well as the destination data. In one embodiment, DD 328 is located within main memory 104. Furthermore, alternate embodiments may use other formats and methods for providing the illustrated information to DMA unit 114 for appropriately defining DMA jobs. For example, the source and destination throttle controls may be stored in different locations or be provided in different portions of the information. For example, the source throttle control may be provided as part of the FD or may be pointed to by the SSG rather than being stored as part of the FD. Also, note that the CFT pointed to by the address in the FD may have a variety of different formats.

Figure 5:
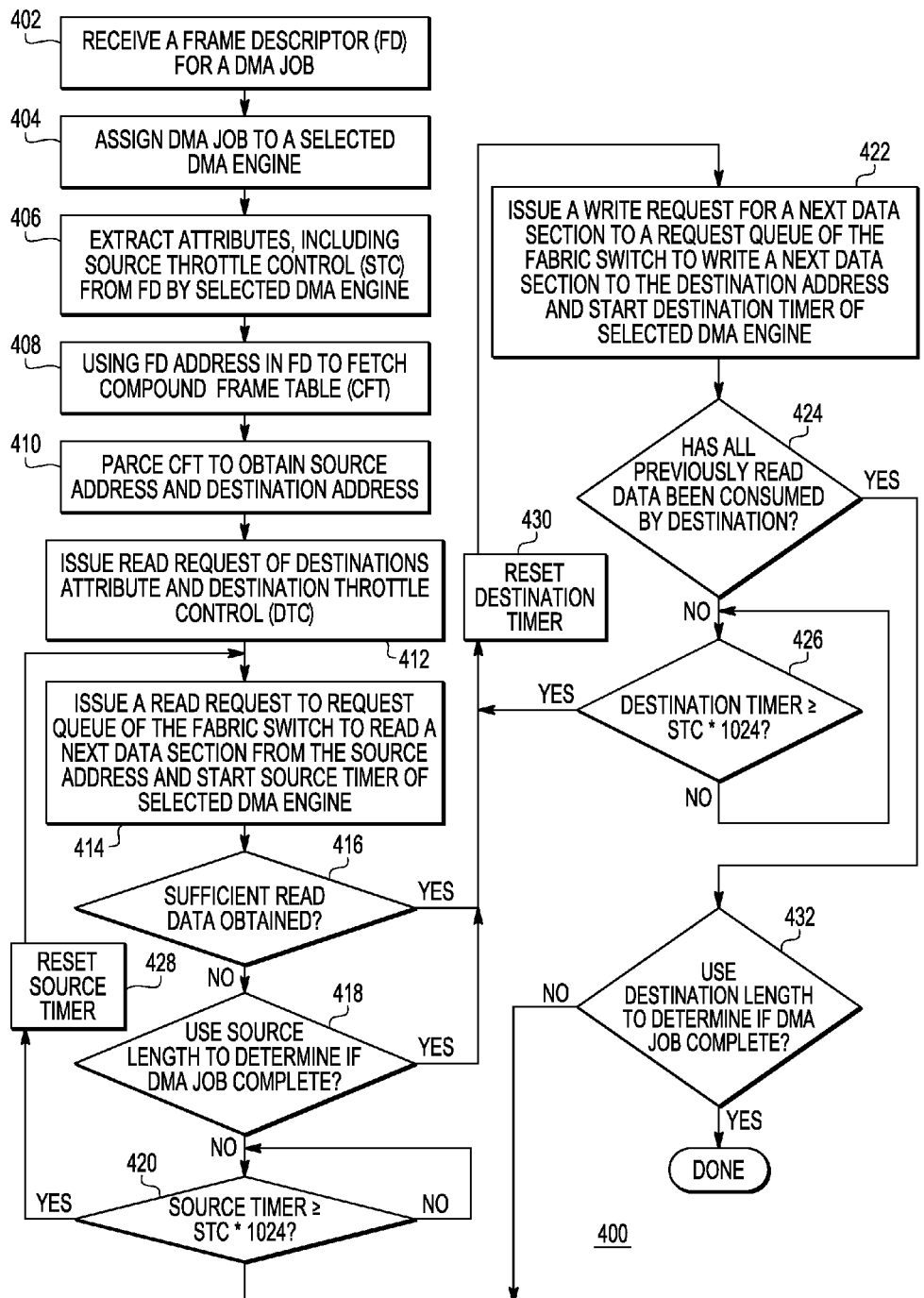
FIG. 5 illustrates, in flow diagram form, a single source and single destination DMA operation, in accordance with one embodiment of the present invention.

FIG. 5 illustrates a method 400 of operation of DMA unit 114 for a DMA job which transfers data from a source device to a single destination device with the use of source throttling or destination throttling. For example, source throttling may be used if the source device is a slower device and the destination throttling may be used if the destination device is a slower device. In the current example, a value of zero for either the source throttle control (STC) or for the destination throttle control (DTC) indicates that throttling for the source or destination, respectively, is not enabled. Method 400 begins with block 402 in which a frame descriptor (FD) is received by DMA unit 114 for a DMA job. In this example, the DMA job involves a data transfer from a source device to a single destination device. Flow proceeds to block 404 in which DMA unit 114 assigns the DMA job to a selected DMA engine within DMA unit 114. Flow proceeds to block 406 in which the selected DMA engine extracts attributes, including the STC from the FD for the current job. Flow proceeds to block 408 in which the selected DMA engine uses the FD address in the FD to fetch the CFT. In one embodiment, the CFT is fetched from main memory 104. Flow proceeds to block 410 in which the DMA engine parses the CFT to obtain the source address and the destination address. Flow then proceeds to block 412 in which the destination address obtaining from the CFT can be used to issue a read request of the destination attributes and the destination throttle control (DTC). In the case of the scatter/gather format, the destination attribute address in the DSG is used to fetch the destination attributes and DTC. However, in other formats (such as for DD 328), the destination attributes and DTC can be obtained directly from the DD. Note that the parsing and fetching may be performed by general control circuitry within DMA unit 114 or may be performed by control circuitry within the selected DMA engine or by combinations thereof.

Once the information of blocks 406, 408, 410, and 412 is obtained, flow proceeds to block 414 in which the selected DMA engine performing the current DMA job issues a read request to an appropriate request queue of peripheral fabric switch 112 to read a next data section from the source address. Also, upon issuing this read request, the source timer of the selected DMA engine is started and begins counting every clock cycle (or every integer number N clock cycles). Note that, if necessary, the source timer of the selected DMA engine may be reset at the point at which it is started. Note that each DMA job reads data from a source device and writes the data to a destination device. In reading the data from a source device, the read data can be separated into sections which are read and then written to the destination device, section by section, in order to transfer all the data of the DMA job. Therefore, in block 414, a read of a data section of the DMA job is requested and routed to the appropriate request queue. For example, if data is being sourced from main memory 104, then the read request is provided, via switch circuitry 218, to system destination request queue 220 so that it may be consumed or processed by main memory 104. If, for example, the data is being sourced from SRIO 116, then the read request is provided, via switch circuitry 218, to SRIO destination request queue 224.

After block 414, flow proceeds to decision diamond 416 in which it is determined if sufficient read data has been obtained in order to commence the writing of the data to the destination device. If so, flow proceeds to block 430 in which the destination timer of the selected DMA engine is reset and then to block 422 in which the selected DMA engine issues a write request for a next data section to a request queue of peripheral fabric switch 112 to write a next data section to the destination address of the DMA job. Also, upon issuing this write request, the destination timer of the selected DMA engine is started and begins counting upon every clock cycle (or every integer number N clock cycles).

Referring back to decision diamond 416, if sufficient data has not been obtained, flow proceeds to decision diamond 418 in which the source length parsed from the CFT is used to determine if the read portion of the DMA job is complete. That is, if all the data to be transferred by the DMA job has been read from the source device, then the read portion is complete and flow proceeds to block 422 in which a write request can be issued, as described above. If the read portion of the DMA job is not complete, however, flow proceeds to decision diamond 420 in which it is determined whether the source timer of the selected DMA engine is greater than or equal to a source timer threshold value. The source timer threshold value is a value that is derived from the STC which was extracted (e.g. from the FD) by the selected DMA engine. In the illustrated embodiment, the source timer threshold value is "STC×1024". If the source timer has reached the source timer threshold (is greater than or equal to the threshold), then flow proceeds to block 428 in which the source timer of the selected DMA engine is reset and flow returns to block 414 in which another read request is issued. However, if the source timer has not yet reached the source timer threshold (is not greater than or equal to the threshold), then flow returns back to decision diamond 420 where the source timer is continuously checked (such as every clock cycle) to determine whether or not it has reached the source timer threshold. In this manner, the selected DMA engine has to wait until the source timer threshold is reached before it is able to issue another read request for a next data section. In this manner, the selected DMA engine and thus the current DMA job is throttled, as determined by the STC value, such that read requests are issued at a slower rate. That is, the STC value is used to set up a source timer threshold which allows only a predetermined amount of data to be read within each window of time (where this window of time corresponds to the source timer threshold). Also, note that if source throttling is disabled, STC has a value of zero. In this case, the result of decision diamond will always be "yes" and thus flow would always return to block 414, without throttling or waiting between read requests, until sufficient read data is obtained or the read portion of the DMA job is complete. In this manner, with an STC value of zero or with source throttling otherwise disabled, read requests can be continuously issued without throttling. Also, note that the use of the STC value and the control of the source timers in the S/D timers of the selected DMA engine may be performed by the corresponding transaction bandwidth control circuitry of the selected DMA engine.

Returning to block 422, which corresponds to a write portion of the DMA job as described above, flow proceeds to decision diamond 424 where it is determined if all previously read data has been consumed by the destination. If so, then there is no more read data from the source ready for inclusion in a write request and flow proceeds to decision diamond 432 in which the destination length (parsed from the CFT) is used to determine if the DMA job is complete, and if so then the data transfer (and thus the current DMA job) is done. If the DMA job is not complete (yet all previously read data has been consumed), flow returns to block 428 so that more read requests can be issued.

If, at decision diamond 424, all previously read data has not yet been consumed by the destination, then more write requests are needed and flow proceeds to decision diamond 426. At decision diamond 426 it is determined whether the destination timer of the selected DMA engine is greater than or equal to a destination timer threshold value. The destination timer threshold value is a value that is derived from the DTC which was extracted (e.g. from the appropriate DD) by the selected DMA engine. In the illustrated embodiment, the destination timer threshold value is "DTC×1024". If the destination timer has reached the destination timer threshold (is greater than or equal to the threshold), then flow proceeds to block 430 in which the destination timer of the selected DMA engine is reset and flow returns to block 422 in which another write request is issued. However, if the destination timer has not yet reached the destination timer threshold (is not greater than or equal to the threshold), then flow returns back to decision diamond 426 where the destination timer is continuously checked (such as every clock cycle) to determined whether or not it has reached the destination timer threshold. In this manner, the selected DMA engine has to wait until the destination timer thresholds is reached before it is able to issue another write request for a next data section. In this manner, the selected DMA engine and thus the current DMA job is throttled, as determined by the DTC value, such that write requests are issued at a slower rate. That is, the DTC value is used to set up a destination timer thresholds which allows only a predetermined amount of data to be written within each window of time (where this window of time corresponds to the destination timer threshold). Also, note that if destination throttling is disabled, DTC has a value of zero. In this case, the result of decision diamond 426 will always be "yes" and thus flow would always return to block 426, without throttling or waiting between write requests. In this manner, with a DTC value of zero or with destination throttling otherwise disabled, write requests can be continuously issued without throttling. Also, note that the use of the DTC value and the control of the destination timers in the S/D timers of the selected DMA engine may be performed by the corresponding transaction bandwidth control circuitry of the selected DMA engine.

Note that the read and write requests issued by the selected DMA engine are issued to request arbiter 200 which controls when these request are actually provided to peripheral fabric switch 112. For example, request arbiter 200 uses system bandwidth control circuitry 216 to determine when requests from the DMA engines can be provided to the fabric switch. However, the source and destination throttle controls provide further per DMA job throttling to further control the rate at which read or write requests are presented to fabric switch 112 by way of request arbiter 200. In one embodiment, request arbiter 200 operates to arbitrate among DMA engines based upon the system bandwidth independently of the source and destination throttling (i.e. the read and write throttling) performed by each DMA engine on a per DMA job basis. Note that the use of request arbiter 200 also applies to the read and write requests issued by the method of FIGS. 5 and 6 below.

Figure 6:
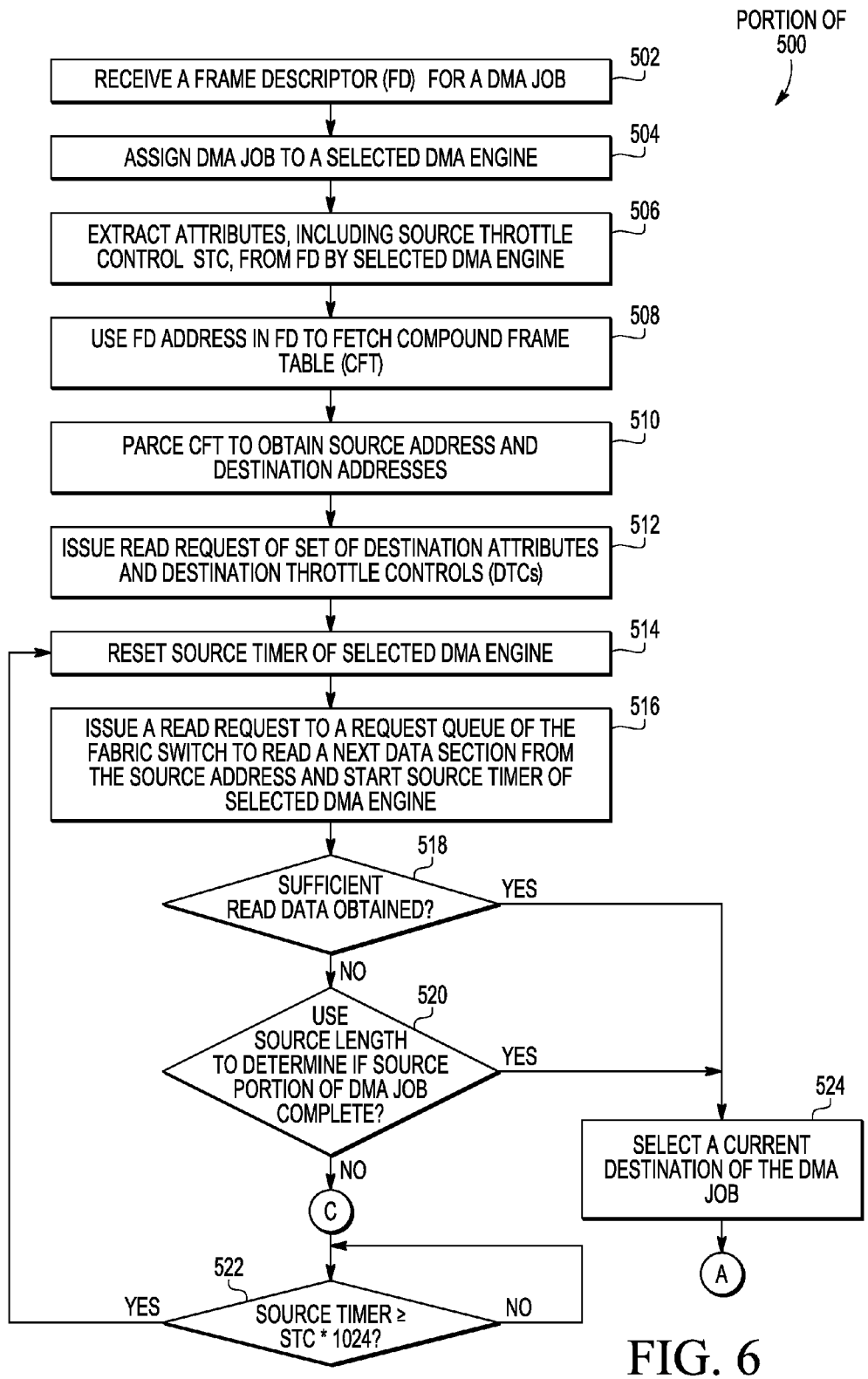
FIGS. 6 and 7 illustrate, in flow diagram form, a single source and multiple destination DMA operation, in accordance with one embodiment of the present invention.
Figure 7:
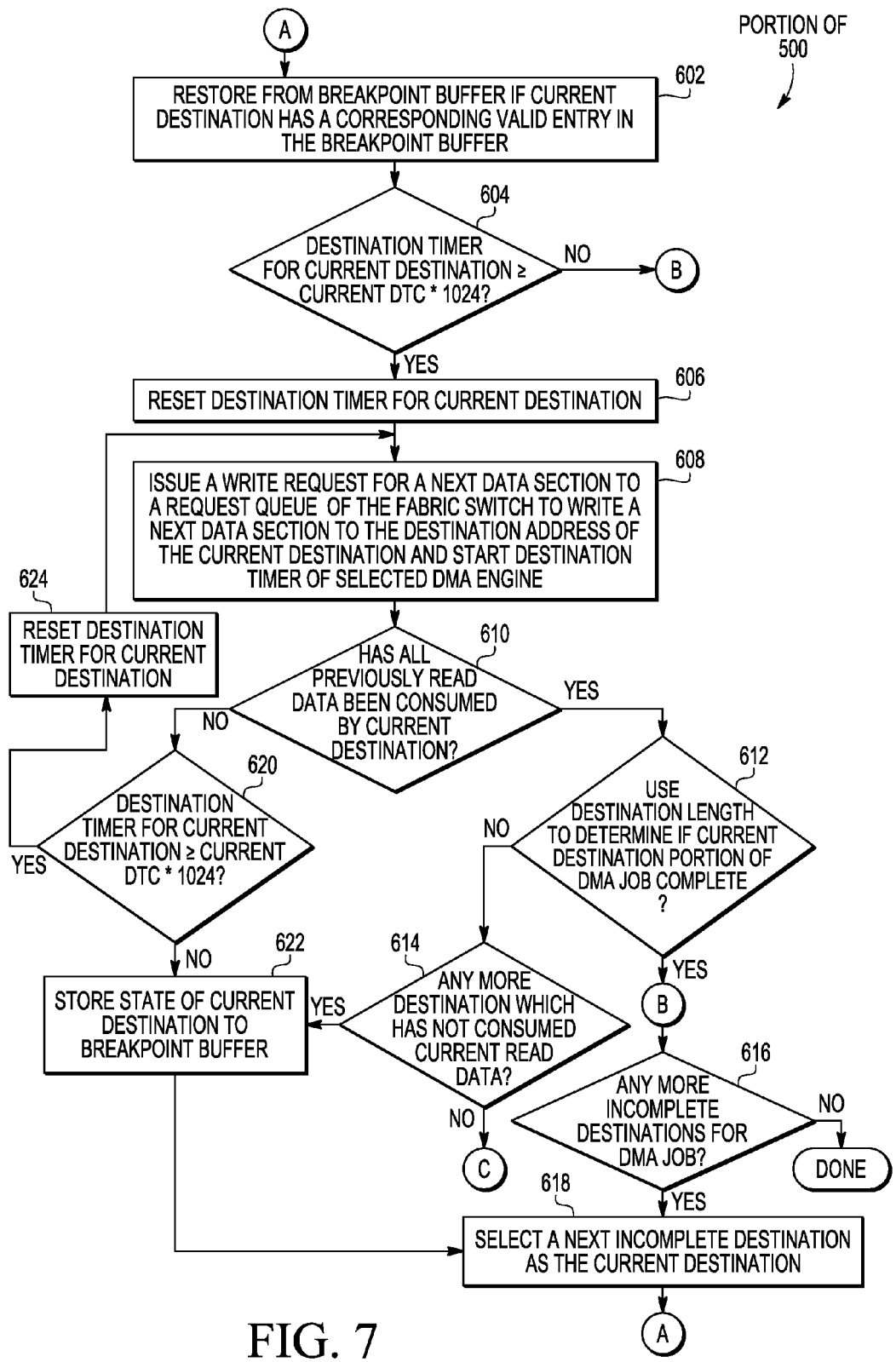

FIGS. 5 and 6 illustrate a method 500 of operation of DMA unit 114 for a multicast DMA job which transfers data from a source device to multiple destination devices with the use of source throttling or destination throttling. Each destination of the multiple destination devices may be independently throttled using a corresponding destination throttle control. Therefore, DMA jobs can be throttled on a per job basis or be throttled on a per job and per destination basis. As with method 400, source throttling may be used if the source device is a slower device and the destination throttling may be used if the destination device is a slower device. In the current example, a value of zero for either the source throttle control (STC) or for any of the destination throttle control (DTC) indicates that throttling for that source or destination is not enabled. Method 500 begins with block 502 in which a frame descriptor (FD) is received by DMA unit 114 for a DMA job. In this example, the DMA job is a multicast DMA job which involves a data transfer from a source device to a multiple destination devices. Flow proceeds to block 504 in which DMA unit 114 assigns the DMA job to a selected DMA engine within DMA unit 114. Flow proceeds to block 506 in which the selected DMA engine extracts attributes, including the STC from the FD for the current job. Flow proceeds to block 508 in which the selected DMA engine uses the FD address in the FD to fetch the CFT. In one embodiment, the CFT is fetched from main memory 104. Flow proceeds to block 510 in which the DMA engine parses the CFT to obtain the source address and the destination addresses. Flow then proceeds to block 512 in which the destination addresses obtained from the CFT can be used to issue a read request of the set of destination attributes and destination throttle controls (DTCs). That is, a destination attribute and a DTC for each destination of the multicast DMA job is obtained. In the case of the scatter/gather format for a particular destination, the destination attribute address in the corresponding DSG is used to fetch the destination attributes and DTC. However, in other formats (such as for DD 328), the destination attributes and DTC for the particular destination can be obtained directly from the DD. Note that the parsing and fetching may be performed by general control circuitry within DMA unit 114 or may be performed by control circuitry within the selected DMA engine or by combinations thereof.

Once the information of blocks 506, 508, 510, and 512 is obtained, flow proceeds to block 514 in which the source timer of the selected DMA engine is reset. Flow then proceeds to block 516 in which the selected DMA engine performing the current DMA job issues a read request to an appropriate request queue of peripheral fabric switch 112 to read a next data section from the source address. Also, upon issuing this read request, the source timer of the selected DMA engine is started and begins counting every clock cycle (or every integer number N clock cycles). Note that, in the current example, each DMA job reads data from a source device and writes the data to multiple destination devices. In reading the data from a source device, the read data can be separated into sections which are read and then written to the destination devices, section by section, in order to transfer all the data of the DMA job. Therefore, in block 516, a read of a data section of the DMA job is requested and routed to the appropriate request queue. For example, if data is being sourced from main memory 104, then the read request is provided, via switch circuitry 218, to system destination request queue 220 so that it may be consumed or processed by main memory 104. If, for example, the data is being sourced from SRIO 116, then the read request is provided, via switch circuitry 218, to SRIO destination request queue 224.

After block 516, flow proceeds to decision diamond 518 in which it is determined if sufficient read data has been obtained in order to commence the writing of the data to any of the destination devices. If so, flow proceeds to block 524 in which a current destination device of the DMA job is selected from the multiple destinations identified for the multicast DMA job by the CFT.

Referring back to decision diamond 518, if sufficient data has not been obtained, flow proceeds to decision diamond 520 in which the source length parsed from the CFT is used to determine if the read portion of the DMA job is complete. That is, if all the data to be transferred by the DMA job has been read from the source device, then the read portion is complete and flow proceeds to block 524. If the read portion of the DMA job is not complete, however, flow proceeds to decision diamond 522 in which it is determined whether the source timer of the selected DMA engine is greater than or equal to a source timer threshold value. The source timer threshold value is a value that is derived from the STC which was extracted (e.g. from the FD) by the selected DMA engine. In the illustrated embodiment, the source timer threshold value is "STC×1000". If the source timer has reached the source timer threshold (is greater than or equal to the threshold), then flow proceeds to block 514 in which the source timer of the selected DMA engine is reset and flow returns to block 516 in which another read request is issued. However, if the source timer has not yet reached the source timer threshold (is not greater than or equal to the threshold), then flow returns back to decision diamond 522 where the source timer is continuously checked (such as every clock cycle) to determine whether or not it has reached the source timer threshold. In this manner, the selected DMA engine has to wait until the source timer threshold is reached before it is able to issue another read request for a next data section. Therefore, the selected DMA engine and thus the current DMA job is throttled, as determined by the STC value, such that read requests are issued at a slower rate. That is, the STC value is used to set up a source timer threshold which allows only a predetermined amount of data to be read within each window of time (where this window of time corresponds to the source timer threshold). Also, note that if source throttling is disabled, STC has a value of zero. In this case, the result of decision diamond will always be "yes" and thus flow would always return to block 514, without throttling or waiting between read requests, until sufficient read data is obtained or the read portion of the DMA job is complete. In this manner, with an STC value of zero or with source throttling otherwise disabled, read requests can be continuously issued without throttling. Also, note that the use of the STC value and the control of the source timers in the S/D timers of the selected DMA engine may be performed by the corresponding transaction bandwidth control circuitry of the selected DMA engine.

Referring back to block 524, after a current destination of the DMA job is selected, flow proceeds through point A to block 602 of FIG. 6. In block 602 information is restored from breakpoint buffer 202 if the current destination has a corresponding valid entry in the breakpoint buffer. That is, as will be described below, if a write to a destination of the multiple destinations of the DMA job has to be throttled and thus interrupted, an entry in breakpoint buffer 202 is used to store information for that destination to allow it to pick up where it left of when it is again the current destination (selected in block 524). For example, as described in reference to FIG. 3, some of the information which is saved to and then restored from a valid entry of breakpoint buffer 202 may be the destination ID (which identifies the corresponding destination), the DTC of that destination, the DMA engine ID (which identifies the DMA engine handling the DMA job for the destination), and any other breakpoint information that may be useful in restoring the current destination. If a write to the current destination has not been previously interrupted, then it does not have a valid entry in the breakpoint buffer and nothing is restored. In one embodiment, the reading and writing to and from breakpoint buffer 202 is performed by the corresponding transaction bandwidth control circuitry of the selected DMA engine.

After block 602, flow proceed to decision diamond 604 where it is determined whether the destination timer for the current destination is greater than a destination timer threshold value for the current destination. In the case of a multicast DMA job, each destination has a corresponding destination timer within the selected DMA engine (e.g. located within S/D timers 230 for DMA engine 204, in S/D timers 232 for DMA engine 206, and in S/D timers 234 for DMA engine 208). Each of these timers, once they are started, may count upon every clock cycle (or ever integer number N clock cycles). Referring to decision diamond 604, the destination timer threshold value for the current destination is a value that is derived from the DTC of the current destination (i.e. the "current DTC") which was extracted by the selected DMA engine (e.g. from the DD corresponding to the current destination). In the illustrated embodiment, the destination timer threshold value is "current DTC×1024". If the destination timer for the current destination has reached the destination timer threshold (is greater than or equal to the threshold), then flow proceeds to block 606 in which the destination timer for the current destination of the selected DMA engine is reset and flow proceeds to block 608 in which a write request is issued. However, if the destination timer for the current destination has not yet reached the destination timer threshold (is not greater than or equal to the threshold), then flow proceeds through point B to block 616. In block 616, it is determined if there are any more incomplete destinations for the DMA job. That is, each destination has to consume the read data for the multicast DMA job. If there are no more incomplete destinations, then the data transfer to the multiple destinations is complete, and thus the current multicast DMA job is done. If there are more incomplete destinations, then flow proceeds to block 618 in which a next incomplete destination of the current DMA multicast job is selected as the current destination. That is, before more writes are issued to the current destination, the selected DMA engine has to wait until the destination timer threshold for that current location is reached. However, note that the selected DMA engine can write to other destinations if their destination timers have expired, this way the selected DMA engine does not have to go idle if the current destination timer has not yet expired. In this manner, the selected destination being accessed within a current multicast DMA job is throttled, as determined by the DTC value for that selected destination, such that write requests are issued at a slower rate. That is, the DTC value for each destination is used to set up a destination timer threshold for each destination which allows only a predetermined amount of data to be written to that destination within each window of time (where this window of time corresponds to the destination timer threshold). Also, note that if destination throttling is disabled for a particular destination, then its corresponding DTC has a value of zero. In this case, flow would always proceed to block 606 and 608 in which a next write request would be issued upon the destination being selected as the current destination again, without throttling. After block 618, flow returns through point A back to block 602 in which a new incomplete destination has been selected as the current destination. Also, note that the use of the DTC values and the control of the destination timers in the S/D timers of the selected DMA engine may be performed by the corresponding transaction bandwidth control circuitry of the selected DMA engine.

Referring back to block 608, a write request for a next data section is issued to a request queue of peripheral fabric switch 112 to write a next data section to the destination address of the current destination of the DMA multicast job. Also, upon issuing this request, the destination timer of the current destination of the selected DMA engine is started and begins counting upon every clock cycle (or every integer number N clock cycles).

After block 610, flow proceeds to decision diamond 610 in which it is determined if previously read data has been consumed by the current destination. If so, then there is no more read data from the source ready for inclusion in a write request to the current destination and flow proceeds to decision diamond 612 in which the destination length (parsed from the CFT for the current destination) is used to determine if the current destination portion of the DMA job is complete. If so, flow proceeds to decision diamond 616 in which it is determined if there are any more incomplete destinations for the DMA job. If not, then the data transfer to the multiple destination is complete, and thus the current multicast DMA job is done. If, at decision diamond 616, there are more incomplete destinations for the current DMA job, then flow flows through point B to block 618.

Referring back to decision diamond 612, if the current destination portion of the DMA job is not complete (yet all previously read data has been consumed), flow proceeds to decision diamond 614 in which it is determined whether there are any more destinations of the current DMA job which has not consumed the current read data. If not, then flow proceeds through point C to decision diamond 522 so that more read requests may be issued. That is, if all previously read data has been consumed, but there are no more destinations which have not consumed the current read data, then the current destination requires more data in order to complete its data transfer. Therefore, more read requests need to be issued. However, at decision diamond 522, a next read request is issued only if the source timer has exceeded the source timer threshold value determined based on the STC, as described above.

If, at decision diamond 614, there are more destinations which have not yet consumed the read data, flow proceeds to block 622. That is, the read data should be stored to each of the destinations of the multicast DMA job. Therefore decision diamond 614 verifies that all destinations have been able to consume the read data. In block 622, the state of the current destination is stored to an entry of breakpoint buffer 202 such that, in block 618, a next incomplete destination can be selected as the current destination to consume the current read data. If, at block 622, the current destination already has a valid entry in breakpoint buffer 202, then the entry may be updated as needed. Otherwise, if no valid entry currently exists in breakpoint buffer 202, then a new valid entry may be created for the current destination. In this manner, when the current destination is again selected to be a current destination, its current status is known. In this manner, flow proceeds after block 618, through point A, with a new current destination.

Referring back to decision diamond 610, if all previously read data has not been consumed by the current destination, flow proceeds to decision diamond 620. At decision diamond 620, it is determined whether the destination timer for the current destination is greater than or equal to the destination timer threshold for the current destination which is based on the DTC of the current destination. In the current example, this value is "current DTC×1024." If so, then another write request can be issued for the current destination. Therefore, if the current destination timer has reached the destination timer threshold value, flow proceeds to block 624 in which the destination timer for the current destination is reset and then to block 608 in which another write request is issued for a next data section to a request queue of the fabric switch to write a next data section to the destination address of the current destination. However, if the current destination timer has not reached the destination timer threshold value, then a next write request for the current destination cannot yet be issued (and thus has been throttled) and flow proceeds to block 622. In block 622, as described above, the state of the current destination is stored to breakpoint buffer 202. If a valid entry for the current destination already exists in breakpoint buffer 202, then the entry can be updated accordingly, or, if a valid entry does not exist within breakpoint buffer 202, a new valid entry can be created for the current destination. Flow then proceeds to block 618 in which a next incomplete destination can be selected as the new current destination. Therefore, note that the write requests can be limited for each destination such that only a certain amount of write requests is allowed for a particular destination within a particular window of time (where that window of time is based on the DTC of that particular destination).

Therefore, by now it can be appreciated that throttling may be used to control reads and writes of a DMA job on a per DMA job basis. Furthermore, in the case of multicast DMA jobs in which read data is transferred to multiple destinations, throttling may be used to independently control data transfer to each of the multiple destinations. For example, in one embodiment, a source throttle control value (i.e. a read throttle control value) is used to determine the rate at which read requests from a source for a DMA job can be issued. Similarly, in one embodiment, a destination throttle control value (i.e. a write throttle control value) is used to determine the rate at which write requests to a destination for a DMA job can be issued. Furthermore, each destination identified by a DMA job can have its own independent destination throttle control value. In this manner, DMA jobs can be throttled, as needed, in order to prevent slower devices from undesirably blocking access to faster devices. Therefore, improved usage of the requests queues within the fabric switch may be achieved. For example, the filling up of requests queues may be reduced or prevented by controlling the rate of requests made to slower devices.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 35 may be located on a same integrated circuit as masters 12 and 14 or on a separate integrated circuit or located within another peripheral or slave discretely separate from other elements of system 10. Peripheral 18 and I/O circuitry 16 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer processing system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, the source and destination throttle control values may be provided in a different manner or stored elsewhere within system 10. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method for controlling bandwidth in a direct memory access (DMA) unit of a computer processing system, the method including assigning a DMA job to a selected DMA engine; starting a source timer; issuing a request to read a next section of data for the DMA job; and if a sufficient amount of the data was not obtained, allowing the DMA engine to wait until the source timer reaches a specified value before continuing to read additional data for the DMA job. Item 2 includes the method of item 1 and further includes resetting the source timer before continuing to read the additional data; and when either the sufficient amount of the data is obtained or all the data for the DMA job has been read, issuing a request to write a next section of data to a destination. Item 3 includes the method of item 1, and further includes starting a destination timer for the current destination; issuing a request to write a next section of data to a destination; if all previously read data has not been consumed by the destination and the destination timer has not reached a specified value: allowing the DMA engine to wait until the destination timer reaches a specified value before continuing to write additional data for the DMA job. Item 4 includes the method of item 1, and further includes receiving a frame descriptor for the DMA job; extracting attributes from the frame descriptor; using a source throttle control indicator in the frame descriptor or in a source descriptor for the DMA job to control the allowing the one of the DMA engines to wait until the source timer reaches the specified value before continuing to read additional data for the DMA job. Item 5 includes the method of item 3, and further includes using a destination throttle control indicator in a destination descriptor for the DMA job to control the allowing the DMA engine to wait until the destination timer reaches a specified value before continuing to write additional data for the DMA job. Item 6 includes the method of item 1, and further includes starting a destination timer; issuing a request to write a next section of data for the DMA job to a current destination; if all previously read data has not been consumed by the current destination before the destination timer reached a specified value: resetting the destination timer for the current destination; and issuing a request to write another next section of data to the current destination. Item 7 includes the method of item 1, and further includes if all previously read data has been consumed by a current destination and a total amount of data for the job has not been written to the current destination: when there is another destination that has not consumed current data: storing a state of the current destination to a breakpoint buffer, selecting the other destination as the current destination, resetting a destination timer for the current destination, and starting the destination timer for the current destination and issuing a request to write a next section of data to the current destination.

Item 8 includes a method for operating a direct memory access (DMA) unit, the method including receiving a destination descriptor for a DMA job; extracting attributes including a destination throttle control indicator from the destination descriptor; issuing a request to read a section of data for the DMA job; issuing a request to write the section of data to a current destination; starting a destination timer for the current destination; if the DMA job is not complete and a destination timer has not reached a specified value based on the destination throttle control indicator: allowing the DMA engine to wait until the destination timer reaches a specified value before continuing to write additional data for the current job. Item 9 includes the method of item 8 and further includes receiving a frame descriptor for the DMA job; assigning the DMA job to a selected DMA engine; extracting a source throttle control indicator from the frame descriptor; starting a source timer; issuing a request to read a next section of data for the DMA job; and if a sufficient amount of the data was not obtained, allowing the DMA engine to wait until the source timer reaches a specified value based on the source throttle indicator before continuing to read additional data for the DMA job. Item 10 includes the method of item 8, and further includes if a sufficient amount of the data was obtained, selecting a current destination of the DMA job; restoring a state of the current destination from a breakpoint buffer, if the state is available; when the destination timer the current destination has exceeded a specified limit: resetting the destination timer for the current destination, and starting the destination timer for the current destination, and issuing a request to write at least a portion of the data to the current destination. Item 11 includes the method of item 8 and further includes if all previously read data has been consumed by the current destination and a total amount of data for the DMA job has been written to the current destination: when there is an incomplete destination for the job: selecting the incomplete destination as the current destination for the DMA job, restoring a state of the current destination from a breakpoint buffer, if the state is available, when the destination timer for the current destination has exceeded a specified limit: resetting a destination timer for the current destination, starting the destination timer for the current destination, and issuing a request to write at least a portion of the data to the current destination; if all previously read data has been consumed by the current destination and a total amount of data for the DMA job has not been written to the current destination: when there is another destination that has not consumed current data: storing a state of the current destination to a breakpoint buffer, selecting the other destination as the current destination, resetting a destination timer for the current destination, and starting the destination timer for the current destination and issuing a request to write the next section of data to the current destination.

Item 12 includes a computer processing system including a direct memory access (DMA) unit that includes: a DMA engine operable to control a rate at which data is read from a source address and a rate at which the data is written to a destination for a DMA job, wherein the DMA engine receives a source throttle control indicator for the DMA job that is set to indicate to the DMA engine to wait if a next section of the data has been read within a specified amount of time and continue reading the data at a later time. Item 13 includes the system of item 12, wherein when the source throttle control indicator is set and a sufficient amount of the data has been read or all the data for the DMA job has been read, the DMA engine issues a request to write a section of the data to a destination. Item 14 includes the system of item 12, wherein when the source throttle control indicator is set: the DMA engine maintains a source timer; and when a sufficient amount of the data has not been read, all the data for the DMA job has not been read, and the source timer is less than a specified value, the DMA engine waits until the source timer reaches the specified value, resets the timer, starts the timer and issues a request to read a next data section from the source address. Item 15 includes the system of item 12, wherein the DMA engine receives a write throttle control indicator for the DMA job that is set to indicate to the DMA engine to store a state of the current destination and select a next incomplete destination as the current destination when either: all previously read data has been consumed by the current destination, all of the data for the DMA job has not been written to the current destination, and there is another destination that has not consumed all of the previously read data; or all previously read data has not been consumed by the current destination and a destination timer for the current destination has not exceeded a specified limit. Item 16 includes the system of item 15, wherein when all previously read data has not been consumed by the current destination and the destination timer has exceeded the specified time limit, the DMA engine resets the destination timer for the current destination, starts the destination timer for the current destination, and issues a request to write a next section of the data to the current destination. Item 17 includes the system of item 12 and further includes a plurality of DMA engines, wherein the DMA engines process a corresponding one of a plurality of DMA jobs; and a breakpoint buffer coupled to the DMA engines, wherein the breakpoint buffer stores information regarding status of writing the data for the DMA jobs. Item 18 includes the system of item 12 wherein if the DMA engine determines that all previously read data has been consumed by the current destination and a total amount of data for the DMA job has been written to the current destination: when there is an incomplete destination for the job, the DMA engine: selects the incomplete destination as the current destination for the DMA job, restores a state of the current destination from a breakpoint buffer, if the state is available, when the destination timer for the current destination has exceeded a specified limit: resets a destination timer for the current destination, starts the destination timer for the current destination, and issues a request to write at least a portion of the data to the current destination. Item 19 includes the system of item 12 wherein when the destination timer for the current destination has not exceeded a specified limit and when there is an incomplete destination for the job: selects a next incomplete destination as the current destination for the DMA job, restores a state of the current destination from a breakpoint buffer, if the state is available, and when the destination timer the current destination has exceeded a specified limit: resets a destination timer for the current destination, and starts the destination timer for the current destination, and issues a request to write at least a portion of the data to the current destination. Item 20 includes the system of item 12, wherein if the DMA engine determines that all previously read data has been consumed by the current destination and a total amount of data for the DMA job has not been written to the current destination: when there is another destination that has not consumed current data, the DMA engine: stores a state of the current destination to a breakpoint buffer, selects the other destination as the current destination, resets a destination timer for the current destination, and starts the destination timer for the current destination and issues a request to write the next section of data to the current destination.

What is claimed is:

1. A method for controlling bandwidth in a direct memory access (DMA) unit of a computer processing system, the method comprising:
   assigning a DMA job to a selected DMA engine;
   starting a source timer;
   issuing a request to read a next section of data for the DMA job; and if a sufficient amount of the data was not obtained, allowing the DMA engine to wait until the source timer reaches a specified value before continuing to read additional data for the DMA job.

2. The method of claim 1 further comprising:
resetting the source timer before continuing to read the additional data; and
when either the sufficient amount of the data is obtained or all the data for the DMA job has been read, issuing a request to write a next section of data to a destination.

3. The method of claim 1, further comprising:
starting a destination timer for the current destination;
issuing a request to write a next section of data to a destination;
if all previously read data has not been consumed by the destination and the destination timer has not reached a specified value:
    allowing the DMA engine to wait until the destination timer reaches a specified value before continuing to write additional data for the DMA job.

4. The method of claim 1, further comprising:
receiving a frame descriptor for the DMA job;
extracting attributes from the frame descriptor; and
using a source throttle control indicator in the frame descriptor or in a source descriptor for the DMA job to control the allowing the one of the DMA engines to wait until the source timer reaches the specified value before continuing to read additional data for the DMA job.

5. The method of claim 3, further comprising:
using a destination throttle control indicator in a destination descriptor for the DMA job to control the allowing the DMA engine to wait until the destination timer reaches a specified value before continuing to write additional data for the DMA job.

6. The method of claim 1, further comprising:
starting a destination timer;
issuing a request to write a next section of data for the DMA job to a current destination;
if all previously read data has not been consumed by the current destination before the destination timer reached a specified value:
    resetting the destination timer for the current destination; and
    issuing a request to write another next section of data to the current destination.

7. The method of claim 1, further comprising:
if all previously read data has been consumed by a current destination and a total amount of data for the job has not been written to the current destination:
    when there is another destination that has not consumed current data:
        storing a state of the current destination to a breakpoint buffer,
        selecting the other destination as the current destination,
        resetting a destination timer for the current destination, and
        starting the destination timer for the current destination and issuing a request to write a next section of data to the current destination.

8. A method for operating a direct memory access (DMA) unit, the method comprising:
receiving a destination descriptor for a DMA job;
extracting attributes including a destination throttle control indicator from the destination descriptor;
issuing a request to read a section of data for the DMA job;
issuing a request to write the section of data to a current destination;
starting a destination timer for the current destination;
if the DMA job is not complete and a destination timer has not reached a specified value based on the destination throttle control indicator:
    allowing the DMA engine to wait until the destination timer reaches a specified value before continuing to write additional data for the current job.

9. The method of claim 8 further comprising:
receiving a frame descriptor for the DMA job;
assigning the DMA job to a selected DMA engine;
extracting a source throttle control indicator from the frame descriptor;
starting a source timer;
issuing a request to read a next section of data for the DMA job; and
if a sufficient amount of the data was not obtained, allowing the DMA engine to wait until the source timer reaches a specified value based on the source throttle indicator before continuing to read additional data for the DMA job.

10. The method of claim 8, further comprising:
if a sufficient amount of the data was obtained, selecting a current destination of the DMA job;
restoring a state of the current destination from a breakpoint buffer, if the state is available;
when the destination timer the current destination has exceeded a specified limit:
    resetting the destination timer for the current destination, and
    starting the destination timer for the current destination, and issuing a request to write at least a portion of the data to the current destination.

11. The method of claim 8, further comprising:
if all previously read data has been consumed by the current destination and a total amount of data for the DMA job has been written to the current destination:
    when there is an incomplete destination for the job:
        selecting the incomplete destination as the current destination for the DMA job,
        restoring a state of the current destination from a breakpoint buffer, if the state is available,
        when the destination timer for the current destination has exceeded a specified limit:
            resetting a destination timer for the current destination,
            starting the destination timer for the current destination, and issuing a request to write at least a portion of the data to the current destination;
if all previously read data has been consumed by the current destination and a total amount of data for the DMA job has not been written to the current destination:
    when there is another destination that has not consumed current data:
        storing a state of the current destination to a breakpoint buffer,
        selecting the other destination as the current destination,
        resetting a destination timer for the current destination, and
        starting the destination timer for the current destination and issuing a request to write the next section of data to the current destination.

12. A computer processing system comprising:
a direct memory access (DMA) unit that includes:
- a DMA engine operable to control a rate at which data is read from a source address and a rate at which the data is written to a destination for a DMA job, wherein
    - the DMA engine receives a source throttle control indicator for the DMA job that is set to indicate to the DMA engine to wait if a next section of the data has been read within a specified amount of time and continue reading the data at a later time.

13. The system of claim 12 wherein:
when the source throttle control indicator is set and a sufficient amount of the data has been read or all the data for the DMA job has been read, the DMA engine issues a request to write a section of the data to a destination.

14. The system of claim 12 wherein:
when the source throttle control indicator is set:
- the DMA engine maintains a source timer; and
- when a sufficient amount of the data has not been read, all the data for the DMA job has not been read, and the source timer is less than a specified value, the DMA engine waits until the source timer reaches the specified value, resets the timer, starts the timer and issues a request to read a next data section from the source address.

15. The system of claim 12, wherein
the DMA engine receives a write throttle control indicator for the DMA job that is set to indicate to the DMA engine to store a state of the current destination and select a next incomplete destination as the current destination when either:
- all previously read data has been consumed by the current destination, all of the data for the DMA job has not been written to the current destination, and there is another destination that has not consumed all of the previously read data; or
- all previously read data has not been consumed by the current destination and a destination timer for the current destination has not exceeded a specified limit.

16. The system of claim 15 wherein:
when all previously read data has not been consumed by the current destination and the destination timer has exceeded the specified time limit, the DMA engine
- resets the destination timer for the current destination,
- starts the destination timer for the current destination, and
- issues a request to write a next section of the data to the current destination.

17. The system of claim 12 further comprising:
a plurality of DMA engines, wherein the DMA engines process a corresponding one of a plurality of DMA jobs; and a breakpoint buffer coupled to the DMA engines, wherein the breakpoint buffer stores information regarding status of writing the data for the DMA jobs.

18. The system of claim 12, wherein
if the DMA engine determines that all previously read data has been consumed by the current destination and a total amount of data for the DMA job has been written to the current destination:
- when there is an incomplete destination for the job, the DMA engine:
    - selects the incomplete destination as the current destination for the DMA job,
    - restores a state of the current destination from a breakpoint buffer, if the state is available,
    - when the destination timer for the current destination has exceeded a specified limit:
        - resets a destination timer for the current destination,
        - starts the destination timer for the current destination, and issues a request to write at least a portion of the data to the current destination.

19. The system of claim 12, wherein
when the destination timer for the current destination has not exceeded a specified limit and when there is an incomplete destination for the job:
- selects a next incomplete destination as the current destination for the DMA job,
- restores a state of the current destination from a breakpoint buffer, if the state is available, and
- when the destination timer the current destination has exceeded a specified limit:
    - resets a destination timer for the current destination, and
    - starts the destination timer for the current destination, and issues a request to write at least a portion of the data to the current destination.

20. The system of claim 12, wherein
if the DMA engine determines that all previously read data has been consumed by
the current destination and a total amount of data for the DMA job has not been written to the current destination:
- when there is another destination that has not consumed current data, the DMA engine:
    - stores a state of the current destination to a breakpoint buffer,
    - selects the other destination as the current destination,
    - resets a destination timer for the current destination, and
    - starts the destination timer for the current destination and issues a request to write the next section of data to the current destination.

* * * * *